United States Patent
Takano et al.

[19]

[11] Patent Number: 6,154,351
[45] Date of Patent: Nov. 28, 2000

[54] APPARATUS FOR DETECTING ABNORMALITY IN DIRECT CURRENT MOTOR DRIVING SYSTEM

[75] Inventors: Nobuhiro Takano, Gifu; Hideyuki Ohashi, Toyota, both of Japan

[73] Assignee: Denso Corporation, Kariya, Japan

[21] Appl. No.: 09/245,916

[22] Filed: Feb. 8, 1999

[30] Foreign Application Priority Data

Feb. 26, 1998 [JP] Japan ................................ 10-045299

[51] Int. Cl.$^7$ ................................................. H02H 5/00
[52] U.S. Cl. ............................... 361/23; 361/30; 361/115
[58] Field of Search .............................. 361/23, 115, 30

[56] References Cited

U.S. PATENT DOCUMENTS

| | | | |
|---|---|---|---|
| 4,066,945 | 1/1978 | Korte, Jr. .................................. | 318/681 |
| 4,494,057 | 1/1985 | Hotta ........................................ | 318/317 |
| 5,150,679 | 9/1992 | Peter ........................................ | 123/397 |

FOREIGN PATENT DOCUMENTS

| | | | |
|---|---|---|---|
| 0 540 218 | 5/1993 | European Pat. Off. ......... | F02D 41/22 |
| 0 692 864 | 1/1996 | European Pat. Off. .......... | H02P 7/00 |
| 0 800 979 | 10/1997 | European Pat. Off. .......... | B62D 5/04 |
| 0 812 753 | 12/1997 | European Pat. Off. .......... | B62D 5/04 |
| 2 657 735 | 8/1991 | France ............................... | H02P 8/00 |
| 61-291225 | 12/1986 | Japan .............................. | B60K 31/02 |
| 7-4296 | 1/1995 | Japan .............................. | F02D 41/22 |

*Primary Examiner*—Stephen W. Jackson
*Attorney, Agent, or Firm*—le;2qNixon & Vanderhye P.C.

[57] ABSTRACT

When transistors are switching-controlled by a microcomputer, on the basis of the absolute value of a value obtained by subtracting an actual opening angle value from an instruction value generated from the microcomputer for the opening angle of a throttle valve serving as a driven apparatus which is driven by a d.c. motor, a current flowing through each of resistors detected by comparators, and voltages at both ends of a resistor detected via each of the buffers, the microcomputer determines an abnormality in the d.c. motor and the throttle valve and an abnormality in the transistors or the power supply path while distinguishing those from each other.

8 Claims, 7 Drawing Sheets

APPARATUS FOR DETECTING ABNORMALITY IN DIRECT CURRENT MOTOR DRIVING SYSTEM

CROSS REFERENCE TO RELATED APPLICATION

This application relates to and incorporates herein by reference Japanese Patent Application No. 10-45299 filed on Feb. 26, 1998.

BACKGROUND OF THE INVENTION

1. Field of the Invention

The present invention relates to an apparatus for detecting an abnormality in a d.c. motor driving system. More particularly, the present invention relates to an abnormality detecting apparatus for detecting an abnormality in a direct current (d.c.) motor driving system including a d.c. motor and a driven apparatus, in which a switching element connected to the d.c. motor in series is provided in a power supply path extending from a driving power source to the d.c. motor and the rotation of the d.c. motor is controlled according to the switching control of the switching element, thereby driving the driven apparatus.

2. Related Art

Conventionally, it is known by unexamined Japanese Patent Laid-open Publication No. Sho 61-291225 to detect an abnormality in a throttle system by generating a pseudo motor drive signal to a motor driving circuit for rotating a d.c. motor forwardly or in reverse while the control of the d.c. motor for driving a throttle valve is cancelled and to detect a terminal voltage of the d.c. motor at that time.

It is also known by unexamined Japanese Patent Laid-open Publication No. Sho 7-4296 to monitor a terminal voltage of a d.c. motor which drives a throttle valve and to detect an abnormality in a throttle actuator on the basis of the terminal voltage, an upper limit value of the terminal voltage which is preset corresponding to an accelerator position and an accelerator position change rate, an accelerator position, and an accelerator position change rate.

The abnormality in the throttle system is caused by not only an abnormality in a throttle actuator system but also an abnormality in a controller system for controlling the d.c. motor for driving the throttle valve.

The abnormalities in the throttle actuator system may be a lock of the d.c. motor for driving the throttle valve, short-circuit of a coil, disconnection in the coil, lock of the throttle valve itself, lock of a gear connecting the d.c. motor and the throttle valve, idling of the d.c. motor due to disengagement of gears, and the like. The abnormalities in the controller system are an abnormality in the switching element as a component of the controller, an abnormality in the power supply path extending from the driving power source to the d.c. motor, and the like.

According to the above conventional system as disclosed in the publications Nos. 61-291225 and 7-4296, however, the abnormality in the throttle actuator system and that in the controller system cannot be distinguished from each other although the abnormality in the throttle system can be detected. Consequently, in case of analyzing the cause of the abnormality in the throttle system, both of the throttle actuator system and the controller system have to be checked. Thus, much time is required to analyze the cause of the abnormality.

With respect to not only the throttle system but also various apparatuses such as a fuel injection pump driving apparatus driven by a d.c. motor, it is required to detect an abnormality in the d.c. motor or a driven apparatus driven by the d.c. motor and an abnormality in a switching element for switching the d.c. motor or a power supply path extending from the driving power source to the d.c. motor while distinguishing those from each other.

SUMMARY OF THE INVENTION

It is an object of the invention to provide an apparatus for detecting an abnormality in a d.c. motor driving system, which can detect an abnormality in the d.c. motor or the driven apparatus driven by the d.c. motor and an abnormality in the switching element for switching the d.c. motor or a power supply path extending from the driving power source to the d.c. motor while distinguishing those from each other.

According to one aspect of the present invention, a circuit which bypasses a d.c. motor is formed by connecting a resistor in parallel with the d.c. motor. At the time of a failure of an open-circuit such as disconnection of a coil in the d.c. motor, the current flows from a driving power source while bypassing the resistor. At the time of an OFF-failure of a switching element or a failure of the open-circuit such as break in a power supply path, the current does not flow through the resistor. The abnormality in the d.c. motor or a driven apparatus and the abnormality in the switching element or the power supply path can be therefore determined while distinguishing those from each other on the basis of a drive corresponding amount, a current value, and a voltage value detected when the switching element is switching-controlled.

According to another aspect of the present invention, by connecting a resistor in parallel with the d.c. motor, a circuit which bypasses the d.c. motor is formed. In a state where the d.c. motor is disconnected from a power supply path, no current flows through the resistor at the time of OFF-failure of a switching element or the failure of the open-circuit such as break in the power supply path. The abnormality in the switching element or the power supply path can be therefore determined on the basis of a current value and a voltage value detected when the switching element is switching-controlled. When the switching element or the power supply path is normal, if there is any abnormality in the d.c. motor driving system, it can be consequently determined that there is an abnormality in the d.c. motor or the driven apparatus. The abnormality in the d.c. motor or the driven apparatus and the abnormality in the switching element or the power supply path can be determined while being distinguished from each other.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

An embodiment of the present invention will be described hereinbelow with reference to the drawings.

Figure 1:
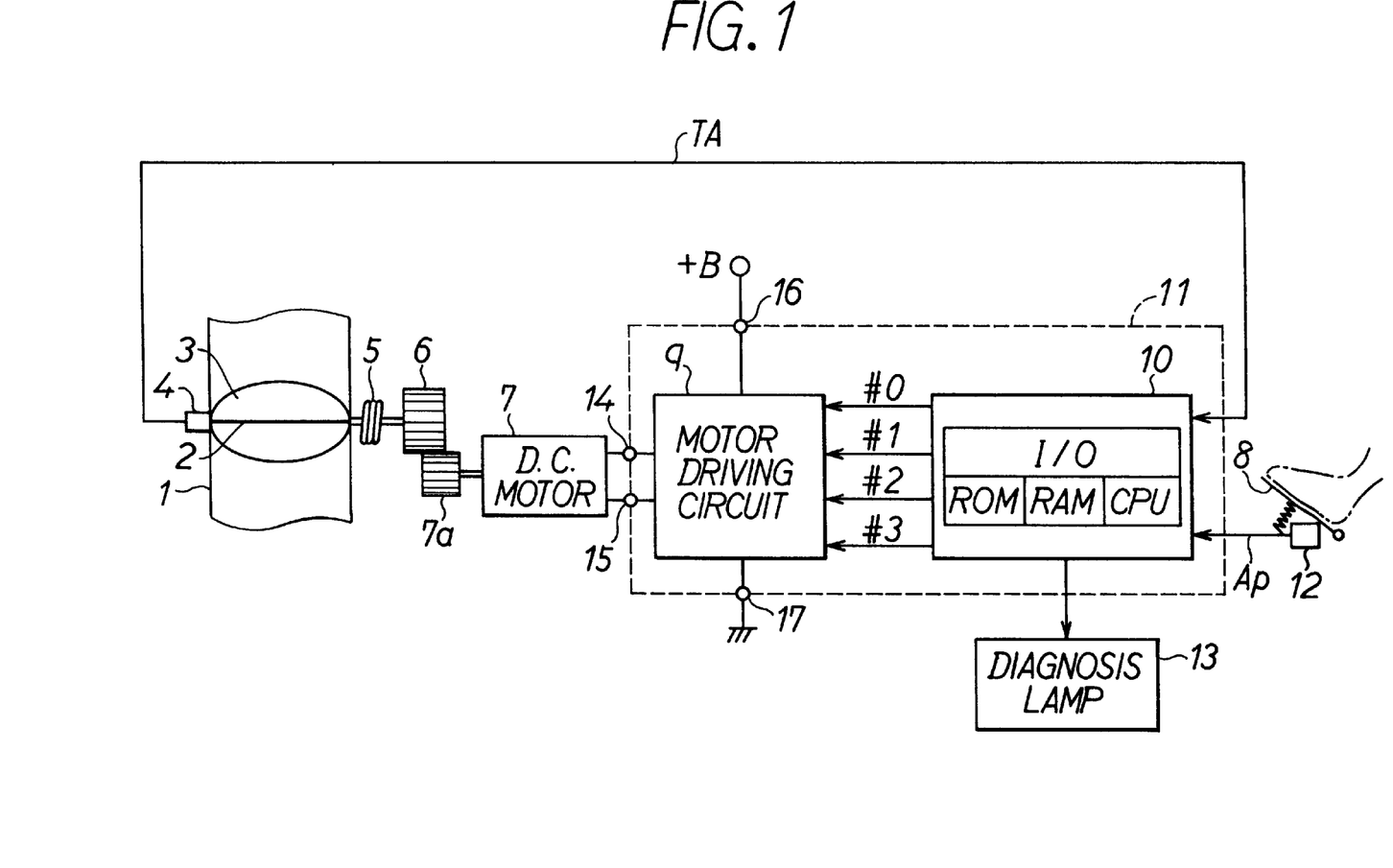
FIG. 1 is a schematic diagram showing the whole configuration of an embodiment of the present invention.

Referring first to FIG. 1, a throttle shaft 2 penetrates an intake pipe 1 for introducing an intake air to an internal combustion engine of a vehicle. In the intake pipe 1, a circular valve plate type throttle valve 3 is fixed to the throttle shaft 2. A throttle opening angle sensor 4 for sensing the opening angle of the throttle valve 3 is provided at one end of the throttle shaft 2. A return spring 5 is wound around the other end of the throttle shaft 2 sot that the throttle valve 3 is biased so as to be closed by the return spring 5. A reduction gear 6 is arranged at the end of the return spring 5 and is engaged with a gear 7a attached to the motor shaft of a d.c. motor 7. An accelerator pedal 8 is provided with an accelerator position sensor 12 for sensing the accelerator position corresponding to a step-on amount of the accelerator pedal 8.

A throttle opening angle signal TA from the throttle opening angle sensor 4 and an accelerator position signal Ap from the accelerator position sensor 12 are supplied to a microcomputer 10 in an ECU 11. The microcomputer 10 has a known configuration having a CPU, a ROM, a RAM, and an I/O circuit, calculates an instruction value of the opening angle of the throttle valve 3 on the basis of the throttle opening angle signal TA and the accelerator position signal Ap, and generates motor driving signals (duty ratio signals) #0 to #3 on the basis of the instruction value. The microcomputer 10 detects an abnormality in the throttle actuator system and an abnormality in the controller system while distinguishing those from each other, as will be described hereinlater, and controls turn-on of a diagnosis lamp 13 provided on an instrumental panel in front of the driver's seat. Electric power is supplied from a vehicle-mounted battery (not shown) to the microcomputer 10 via an ignition switch (not shown).

A motor driving circuit 9 in the ECU 11 is connected to the d.c. motor 7 via terminals 14 and 15 and are connected from a terminal 16 via an ignition switch to the positive side of the vehicle-mounted battery. A battery voltage +B is applied to the motor driving circuit 9 and is grounded to a vehicle chassis via a terminal 17. The motor driving circuit 9 drives the d.c. motor 7 on the basis of the motor driving signals #0 to #3 generated by the microcomputer 10.

When the d.c. motor 7 is driven in the forward direction, the throttle shaft 2 is driven against the force biased in the closing direction by the return spring 5 and the throttle valve 3 is turned so as to be opened by the driving of the throttle shaft 2. As a result, the volume of intake air introduced through the intake pipe 1 to the internal combustion engine increases according to the increase in the opening angle of the throttle valve 3.

Figure 2:
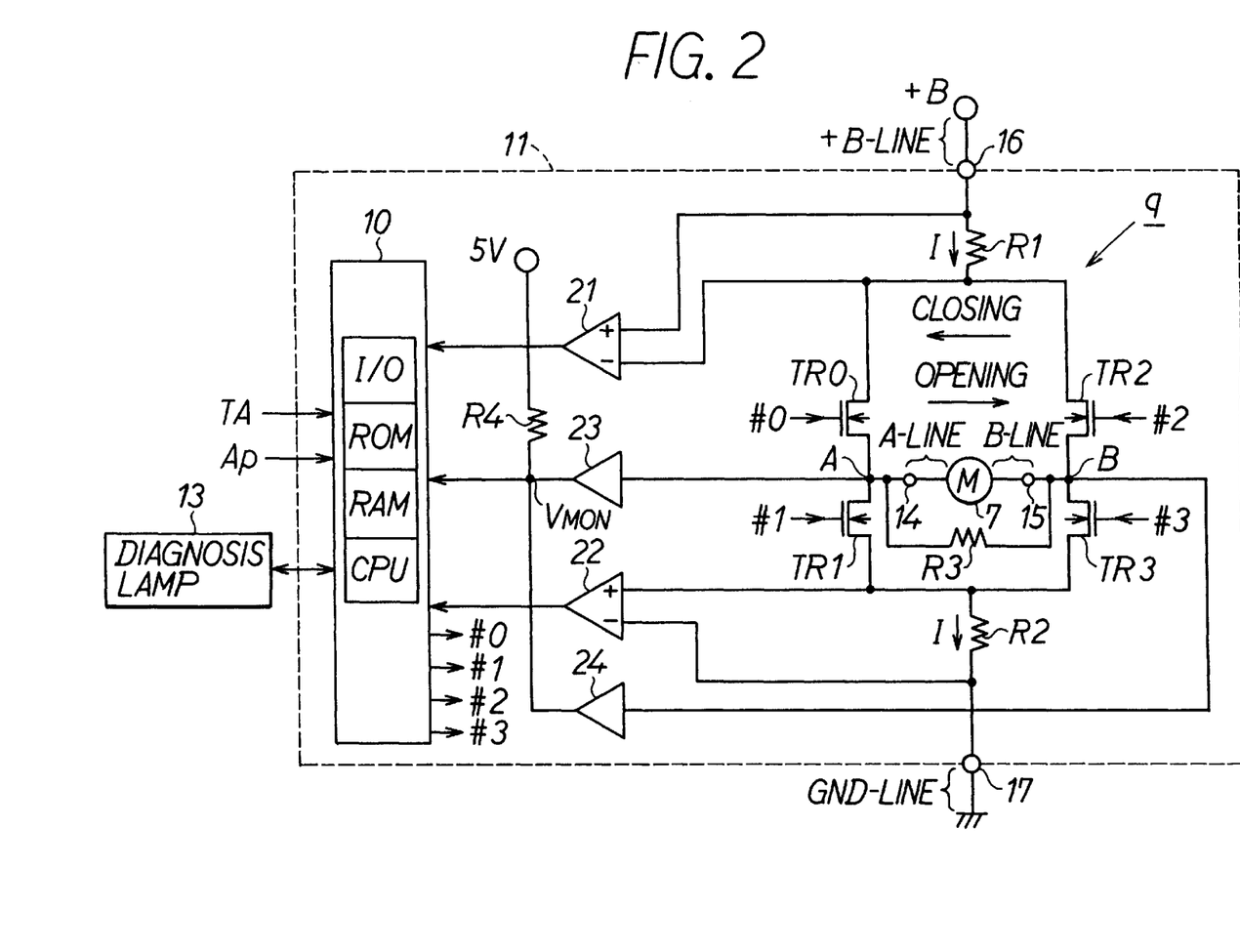
FIG. 2 is a block circuit diagram showing the internal configuration of an ECU of the embodiment.

As shown in FIG. 2, the driving circuit 9 in the ECU 11 comprises NMOS transistors TR0 to TR3, comparators 21 and 22, buffers 23 and 24, and resistors R1 to R4.

One end of the resistor R1 is connected to the positive side of the vehicle-mounted battery via the terminal 16 and the battery voltage +B is applied. One end of the resistor R2 is grounded to the vehicle chassis via the terminal 17. Between the other ends of the resistors R1 and R2, the transistors TR0 and TR1 which are connected in series and the transistors TR2 and TR3 which are connected in series are connected in parallel. The line extending from the terminal 16 to the positive side of the vehicle-mounted battery is called a +B-line and the line extending from the terminal 17 to the ground is called a GND-line. Each of the +B-line and the GND-line is formed by wire harness.

A node A between the transistors TR0 and TR1 is connected to the terminal 14, a node B between the transistors TR2 and TR3 is connected to the terminal 15, and the resistor R3 is connected between the nodes A and B. That is, since the d.c. motor 7 is connected between the terminals 14 and 15, the resistor R3 is connected in parallel with the d.c. motor 7. The value of resistance of the resistor R3 is set to be a value sufficiently larger than the value of resistance of the coil of the d.c. motor 7. A current hardly flows through the resistor R3 in a state where the d.c. motor 7 is connected between the terminals 14 and 15. The line extending from the terminal 14 to one of the input terminals of the d.c. motor 7 is called an A-line and the line extending from the terminal 15 to the other input terminal of the d.c. motor 7 is called a B-line. Each of the A and B-lines is formed by wire harness.

The motor driving signals #0 to #3 generated by the microcomputer 10 are supplied to the gates of the transistors TR0 to TR3, respectively.

In order to rotate the d.c. motor 7 in the forward direction when the d.c. motor 7 is PWM driven by using the transistors TR0 to TR3, the logical level of each of the motor driving signals #0 and #3 is set to "H" so as to turn on the transistors TR0 and TR3, and the logical level of each of the motor driving signals #1 and #2 is set to "L" so as to turn off the transistors TR1 and TR2. That is, in a control of opening the throttle valve 3 by rotating the d.c. motor 7 in the forward direction (hereinbelow, called an opening control), a motor driving current (i) flows in a current path from the positive side (+B) of the vehicle-mounted battery through the terminal 16, resistor R1, transistor TR0, A-line (from node A to terminal 14), d.c. motor 7, B-line (from terminal 15 to node B), transistor TR3, resistor R2, and terminal 17 to the ground.

In order to rotate the d.c. motor 7 in reverse, the logical level of each of the motor driving signals #0 and #3 is set to "L" so as to turn off the transistors TR0 and TR3 and the logical level of each of the motor driving signals #1 and #2 is set to "H" so as to turn on the transistors TR1 and TR2. That is, in a control of closing the throttle valve 3 by rotating the d.c. motor 7 in reverse (hereinbelow, called a closing control), the motor driving current (i) flows in a current path from the positive side (+B) of the vehicle-mounted battery through terminal 16, resistor R1, transistor TR2, B-line (from node B to terminal 15), d.c. motor 7, A-line (from terminal 14 to node A), transistor TR1, resistor R2, and terminal 17 to the ground.

The node A is connected to the input terminal of the buffer 23 and the node B is connected to the input terminal of the buffer 24. The output terminals of the buffers 23 and 24 are connected to the internal power source via the resistor R4 so that a predetermined voltage (5V) is applied, and are connected to the microcomputer 10. Each of the buffers 23 and 24 has the characteristics of high input impedance and low output impedance, thereby preventing an influence of a voltage VMON at the output terminal of each of the buffers 23 and 24 from being exerted on the voltage of each of the nodes A and B.

Both ends of the resister R1 are connected to the input terminals of the comparator 21 and both ends of the resistor R2 are connected to the input terminals of the comparator 22. The comparator 21 determines it is checked whether or not a current I flowing through the resistor R1 is larger than a set value M on the basis of a voltage across the resistor R1, and the comparator 22 determines it is checked whether or not the current I flowing through the resistor R2 is larger than the set value M on the basis of a voltage across the resistor R2. When the current I is larger than the set value M, the output signal at the logical level of "H" is generated. When the current I is equal to or smaller than the set value M, an output signal at the logical level of "L" is generated. When the throttle system is normal, the set value M is predetermined so that the current I is equal to or smaller than the set value M. The output terminals of the comparators 21 and 22 are connected to the microcomputer 10.

The microcomputer 10 detects an abnormality in the throttle actuator system and that in the controller system while distinguishing those from each other on the basis of the throttle opening angle signal TA, the logical levels of the motor driving signals #0 to #3, the logical levels of the voltage VMON at the output terminals of the buffers 23 and 24, and the logical levels at the output terminals of the comparators 21 and 22.

The abnormalities in the throttle actuator system are a failure of break in the A or B-line, lock of the d.c. motor 7, short-circuit of the coil, disconnection of the coil, lock of the throttle valve 3, lock of each of the gears 6 and 7a, and idling of the d.c. motor 7 due to imperfect engagement caused by disengagement of the gears 6 and 7a.

The abnormalities in the controller system are a failure that the transistors TR0 to TR3 remain ON (hereinbelow, called an "ON-failure"), a failure that the transistors TR0 to TR3 remain OFF (hereinbelow, called an "OFF-failure"), and an abnormality in the power supply path.

The abnormalities in the power supply path are a failure of the break or disconnection in the resistor R1 or R2 (hereinbelow, called "resistor R1 open" or "resistor R2 open"), a failure of short-circuit of the A or B-line with the positive side (+B) of the vehicle-mounted battery (hereinbelow, called "short-circuit between the A or B-line and +B"), a failure in the connection of the A or B-line to the ground (hereinbelow, called "short-circuit between the A or B-line and the ground"), and a failure of break in the +B-line or the GND-line. The short circuit between the A or B-line and +B and the short circuit between the A or B-line and the ground occur when the wire harness making the lines is short-circuited with the positive side (+B) of the vehicle-mounted battery or the vehicle body.

The details of processes executed by the microcomputer 10 to detect an abnormality in the throttle system in a state where the d.c. motor 7 is connected to the terminals 14 and 15 will be described with reference to the flow diagrams shown in FIGS. 3 to 5.

In this case, as inspection conditions, the ignition switch is turned on and the operation of the internal combustion engine is stopped. When the microcomputer 10 is activated by turning on the ignition switch and supplying the power from the vehicle-mounted battery, processes in the following steps are executed by various arithmetic processes by the computer in accordance with a program stored in the built-in ROM.

Figure 3:
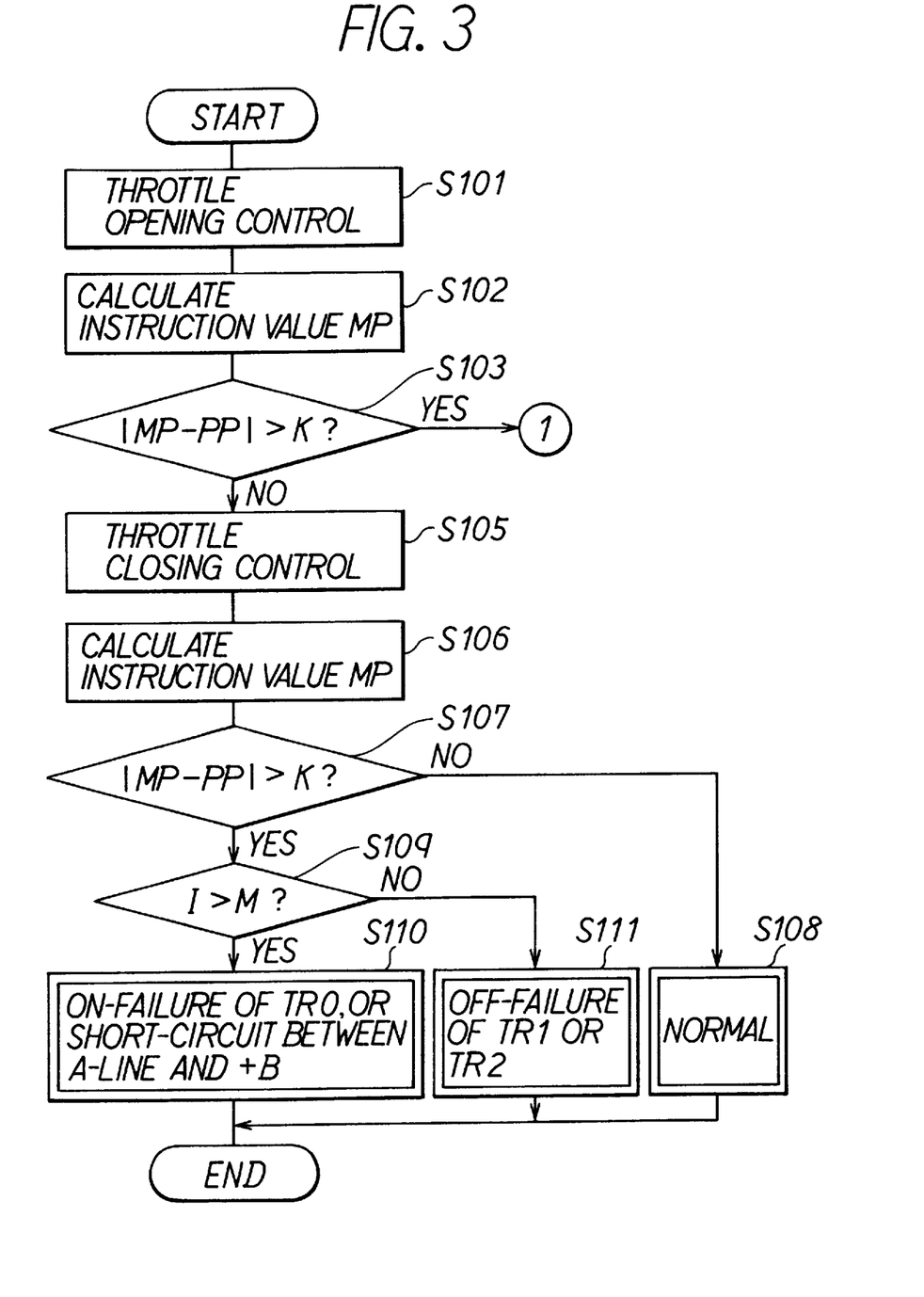
FIG. 3 is a flow diagram showing a computer processing of the embodiment when a d.c. motor is connected.

In S (Step) 101 in FIG. 3, the opening control is executed by repeatedly turning on and off the transistor TR3 at a predetermined duty ratio in a state where the transistor TR0 is kept turned on. As a result, the d.c. motor 7 is driven in the forward direction when the transistor TR3 is ON and the throttle valve 3 is rotated so as to be opened, thereby generating the throttle opening angle signal TA corresponding to the opening angle of the throttle valve 3 from the throttle opening angle sensor 4.

In S102, an instruction value MP of the opening angle of the throttle valve 3 is calculated.

In S103, an actual opening angle value PP corresponding to the throttle opening angle signal TA generated in S101 is subtracted from the instruction value MP of the opening angle of the throttle valve 3. It is checked whether the absolute value of the value (=MP–PP) is larger than a set value K or not. When it is larger than the set value K, the routine shifts to S104 shown in FIG. 4. When it is equal to or smaller than the set value K, the routine shifts to S105. The set value K is predetermined so that the absolute value of the value (MP–PP) is equal to or smaller than the set value K when the throttle system is normal.

In S105, the closing control is executed by repeatedly turning on and off the transistor TR1 at a predetermined duty ratio in a state where the transistor TR2 is kept turned on. As a result, the d.c. motor 7 is driven in the reverse direction when the transistor TR1 is ON and the throttle valve 3 is rotated so as to be closed, thereby generating the throttle opening angle signal TA corresponding to the opening angle of the throttle valve 3 from the throttle opening angle sensor 4.

In S106, the instruction value MP of the opening angle of the throttle valve 3 is calculated.

In S107, the actual opening angle value PP corresponding to the throttle opening angle signal TA generated in S105 is subtracted from the instruction value MP of the opening angle of the throttle valve 3. It is checked whether the absolute value of the value (=MP–PP) is larger than the set value K or not. When it is equal to or smaller than the set value K, the routine advances to S108. When it is larger than the set value K, the routine advances to S109.

In S108, the throttle system is determined as normal.

That is, since there is no abnormality in the opening control when the absolute value of the value (MP–PP) is equal to or smaller than the set value K (NO in S103) at the time of opening control (S101) and there is no abnormality in the closing control when the absolute value of the value (MP–PP) is equal to or smaller than the set value K (NO in S107) at the time of closing control (S105), it can be the that the throttle system is normal.

In S109, it is checked whether the current I is larger than the set value M or not on the basis of the logical level of the output signal of each of the comparators 21 and 22. When it is larger than the set value M, the routine advances to S110. When it is equal to or smaller than the set value M, the routine advances to S111. That is, when the logical level of the output signal of either the comparator 21 or 22 is "H", it is determined that the current I is larger than the set value M. When the logical levels of both of the output signals of the comparators 21 and 22 are "L", it is determined that the current I is equal to or smaller than the set value M.

In S110, it is determined that the transistor TR0 has either the ON-failure or the short-circuit between the A-line and +B.

That is, when the transistor TR0 has the ON-failure, at the time of closing control (S105), the current flowing in the path through the resistor R1, transistor TR0, transistor TR1, and resistor R2 is added to the current flowing in the path through the resistor R1, transistor TR2, d.c. motor 7, transistor TR1, and resistor R2. Consequently, the current I flowing through each of the resistors R1 and R2 becomes larger than the set value M (YES in S109).

In case of the short-circuit between the A-line and +B, at the time of closing operation (S105), the current flowing in the path from the positive side (+B) of the vehicle-mounted battery through the A-line, transistor TR1, and resistor R2 is added to the current flowing in the path through the transistor TR2, d.c. motor 7, transistor TR1, and resistor R2. Consequently, the current I flowing through the resistor R2 becomes larger than the set value M (YES in S109).

In S111, it is determined that at least one of the transistors TR1 and TR2 has the OFF-failure.

That is, when either the transistor TR1 or TR2 has the OFF-failure, the current I does not flow in the path through the transistor TR2, d.c. motor 7, and transistor TR1 at the time of the closing control (S105). Consequently, the current I becomes smaller than the set value M (NO in S109).

Figure 4:
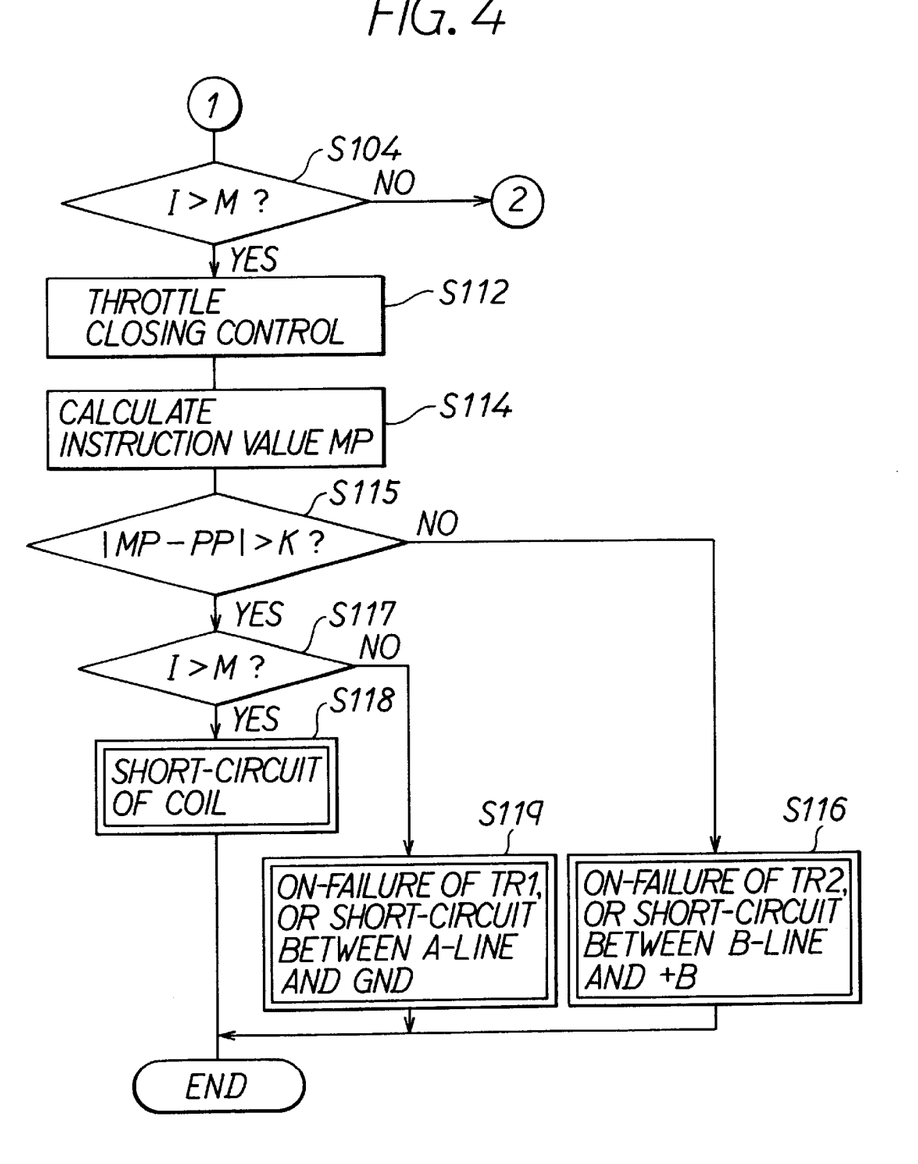
FIG. 4 is a flow diagram showing a computer processing of the embodiment when the d.c. motor is connected.

In S104 shown in FIG. 4, in a manner similar to S109, it is checked whether the current I is larger than the set value M or not. When it is larger than the set value M, the routine advances to S112. When it is equal to or smaller than the set value M, the routine advances to S113 shown in FIG. 5.

In S112, the closing control is executed in a manner similar to S105. In S114, the instruction value MP of the opening angle of the throttle valve 3 is calculated in a manner similar to S106.

In S115, the actual opening angle value PP corresponding to the throttle opening angle signal TA generated in S112 is subtracted from the instruction value MP of the opening angle of the throttle valve 3. It is checked whether the absolute value of the value (=MP–PP) is larger than the set value K or not. If it is equal to or smaller than the set value K, the routine advances to S116. If it is larger than the set value K, the routine advances to S117.

In S116, either the ON-failure of the transistor TR2 or the short-circuit between the B-line and +B is determined.

That is, when the transistor TR2 has the ON-failure, at the time of the opening control (S101), the current flowing in the path through the resistor R1, transistor TR2, transistor TR3, and resistor R2 is added to the current flowing in the path through the resistor R1, transistor TR0, d.c. motor 7, transistor TR3, and resistor R2. Consequently, the current I flowing through the resistors R1 and R2 becomes larger than the set value M (YES in S104).

In case of the short-circuit between the B-line and +B, at the time of the opening control (S101), the current flowing in the path from the positive side (+B) of the vehicle-mounted battery through the B-line, transistor TR3, and resistor R2 is added to the current flowing in the path through the transistor TR0, d.c. motor 7, transistor TR3, and resistor R2. Consequently, the current I flowing in the resistor R2 becomes larger than the set value M (YES in S104).

In S117, in a manner similar to S109, it is checked whether the current I is larger than the set value M or not. If it is larger than the set value M, the routine advances to S118. If it is equal to or smaller than the set value M, the routine advances to S119.

In S118, it is determined that the short-circuit of the coil in the d.c. motor 7 occurs.

That is, the value of resistance of the coil in the d.c. motor 7 is normally few ohms. In case of the short-circuit of the coil, however, the value of resistance becomes nearly zero ohm, so that the current I becomes larger than the set value M at the time of both the opening control (S101) and the closing control (S112) (YES in S104 and S117).

In S119, either the ON-failure of the transistor TR1 or the short-circuit between the A-line and the ground is determined.

That is, when the transistor TR1 has the ON-failure, at the time of opening control (S101), the current flowing in the path through the resistor R1, transistor TR0, transistor TR1, and resistor R2 is added to the current flowing in the path through the resistor R1, transistor TR0, d.c. motor 7, transistor TR3, and resistor R2. Consequently, although the current I flowing through the resistors R1 and R2 becomes larger than the set value M (YES in S104), the current I becomes equal to or smaller than the set value M at the time of closing control (S112) (NO in S117).

In case of the short-circuit between the A-line and the ground, at the time of the opening control (S101), the current flows in the path through the resistor R1, transistor TR0, A-line, and to the ground. Consequently, although the current I flowing through the resistor R1 becomes larger than the set value M (YES in S104), the current I becomes equal to or smaller than the set value M at the time of the closing control (S112) (NO in S117).

Figure 5:
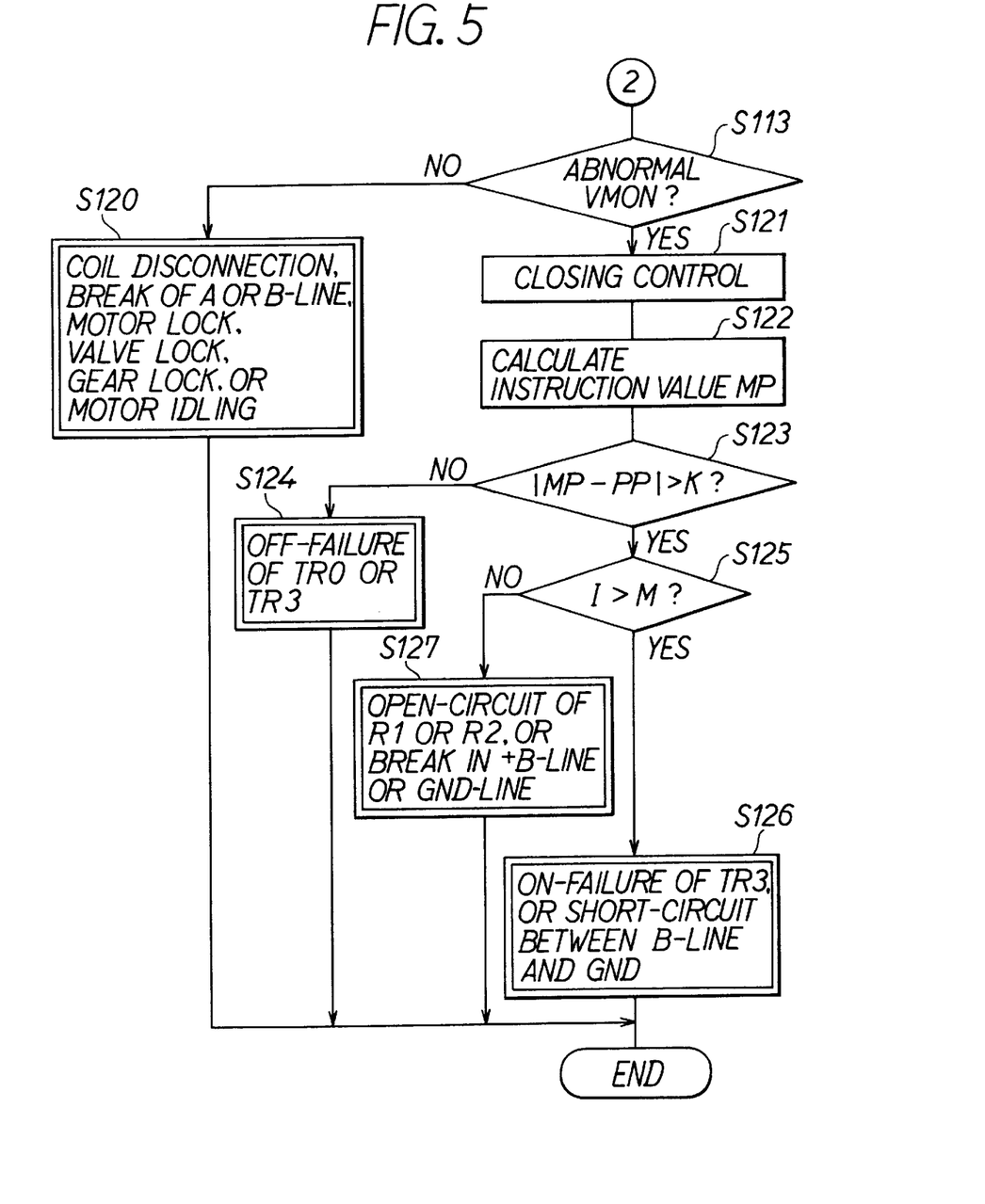
FIG. 5 is a flow diagram showing a computer processing of the embodiment when the d.c. motor is connected.

In S113 shown in FIG. 5, it is checked whether a change in the logical level of the voltage VMON at the output terminal of each of the buffers 23 and 24 corresponds to the ON/OFF operation of the transistor TR3 in the opening control in S101. If yes, the routine advances to S120. When the change in the logical level of the voltage VMON does not correspond to the operation and is abnormal, the routine moves to S121.

That is, at the normal time of the throttle system, when the transistor TR0 is ON and the transistor TR3 is ON, the voltage at the node A becomes high, so that the voltage at the output terminal of the buffer 23 becomes high. The voltage at the node B becomes low, so that the voltage at the output terminal of the buffer 24 becomes low. Consequently, the logical level of the voltage VMON is set to "L" by the buffer 24. When the transistor TR0 is ON and the transistor TR3 is OFF, the voltage at each of the nodes A and B becomes high, so that the voltage at the output terminal of each of the buffers 23 and 24 becomes high, and the logical level of the voltage VMON is set to "H" by the resistor R4.

In S120, it is determined that at least one of failures in a group occurs. The group includes the disconnection of the coil in the d.c. motor 7, the break in the A or B-line, lock of the d.c. motor 7, lock of the throttle valve 3, lock of each of the gears 6 and 7a, and idling of the d.c. motor 7 due to disengagement of the gears 6 and 7a.

In other words, when the absolute value of the value (MP–PP) is larger than the set value K (YES in S103) at the time of opening control (S101), an abnormality occurs in the opening control. When the current I flowing through each of the resistors R1 and R2 is equal to or smaller than the set value M (NO in S104) and the change in the logical level of the voltage VMON corresponds to the ON/OFF operation of the transistor TR3 (NO in S113) at the time of the opening control (S101), there is no abnormality in the controller system and no short-circuit of the coil in the d.c. motor 7. It can be therefore the either one of the above-mentioned failures occurs.

In a manner similar to S105, the closing control is performed in S121. Subsequently, in a manner similar to S106, the instruction value MP of the opening angle of the throttle valve 3 is calculated in S122.

In S123, the actual opening angle value PP corresponding to the throttle opening angle signal TA generated in S121 is subtracted from the instruction value MP of the opening angle of the throttle valve 3 and it is checked whether the absolute value of the value (=MP–PP) is larger than the set value K or not. If it is equal to or smaller than the set value K, the routine advances to S124. If it is larger than the set value K, the routine shifts to S125.

It is determined in S124 that at least one of the transistors TR0 and TR3 has the OFF-failure.

That is, in the case where there is an abnormality in the opening control when the absolute value of the value (MP–PP) is larger than the set value K (YES in S103) at the time of opening control (S101), the current I flowing through each of the resistors R1 and R2 is equal to or smaller than the set value M (NO in S104), and there is an abnormality (YES in S113) since the change in the logical level of the voltage VMON does not correspond to the ON/OFF operation of the transistor TR3 at the time of the opening control (S101). However, the absolute value of the value (MP–PP) is equal to or smaller than the set value M (NO in S123) at the time of the closing control (S121) and there is no abnormality in the closing control, the only possibility is that either the transistor TR0 or TR3 has the OFF-failure.

It is checked whether the current I is larger than the set value or not in S125 in a manner similar to S109. When it is larger than the set value M, the routine advances to S126. When it is equal to or smaller than the set value M, the routine advances to S127.

In S126, it is determined that either the ON-failure of the transistor TR3 or the short circuit between the B-line and the ground occurs.

That is, when the transistor TR3 has the ON-failure, at the time of the closing control (S121), the current flowing in the path through the resistor R1, transistor TR2, transistor TR3, and resistor R2 is added to the current flowing in the path through the resistor R1, transistor TR2, d.c. motor 7, transistor TR1, and resistor R2. Consequently, the current I flowing through the resistors R1 and R2 becomes larger than the set value M (YES in S125).

In case of the short-circuit between the B-line and the ground, at the time of the closing control (S121), the current flows through the path through the resistor R1, transistor TR2, and B-line to the ground, so that the current I flowing through the resistor R1 becomes larger than the set value M (YES in S125).

In S127, it is determined that open-circuit of the resistor R1 or R2 or the break in the +B-line or GND-line occurs.

That is, when the open-circuit of the resistor R1 or R2 or the break in the +B-line or GND-line occurs, the current I does not flow at the time of both the opening control (S101) and the closing control (S121), so that the current I becomes equal to or smaller than the set value M (NO in S104 and S125).

When the resistor R3 which is connected in parallel with the d.c. motor 7 is omitted, the determination cannot be performed while distinguishing steps S124, S127, and S120 from each other.

As described above in detail, according to the embodiment, by detecting an abnormality in the throttle system in accordance with the flow diagrams shown in FIGS. 3 to 5 in the state where the d.c. motor 7 is connected to the terminals 14 and 15, the detection can be carried out while distinguishing an abnormality in the throttle actuator (S118 and S120) and an abnormality in the controller system (S110, S111, S116, S119, S124, S126, and S127) from each other. By analyzing the result of determination of the microcomputer 10, the cause of the abnormality in the throttle system can be therefore easily analyzed without requiring much time.

When an abnormality in the throttle system is detected, the microcomputer 10 sets the logical level of each of the motor driving signals #0 to #3 to "L" to turn off the transistors TR0 to TR3 and turns on the diagnostic lamp 13, thereby notifying the driver of the abnormality in the throttle system. When the throttle system is abnormal, therefore, the operation of the internal combustion engine is stopped and the driver can recognize the abnormality in the throttle system.

The details of processes executed by the microcomputer 10 when the abnormality in the throttle system is detected in the state where the d.c. motor 7 is disconnected from the terminals 14 and 15 will be described by using the flow diagrams shown in FIGS. 6 and 7.

As inspection conditions, the ignition switch is turned on and the operation of the internal combustion engine is stopped. The microcomputer 10 is activated when the ignition switch is turned on and the power is supplied from the vehicle-mounted battery, and the processes in the following steps are executed by various arithmetic processes by the computer in accordance with a program stored in the built-in ROM.

Figure 6:
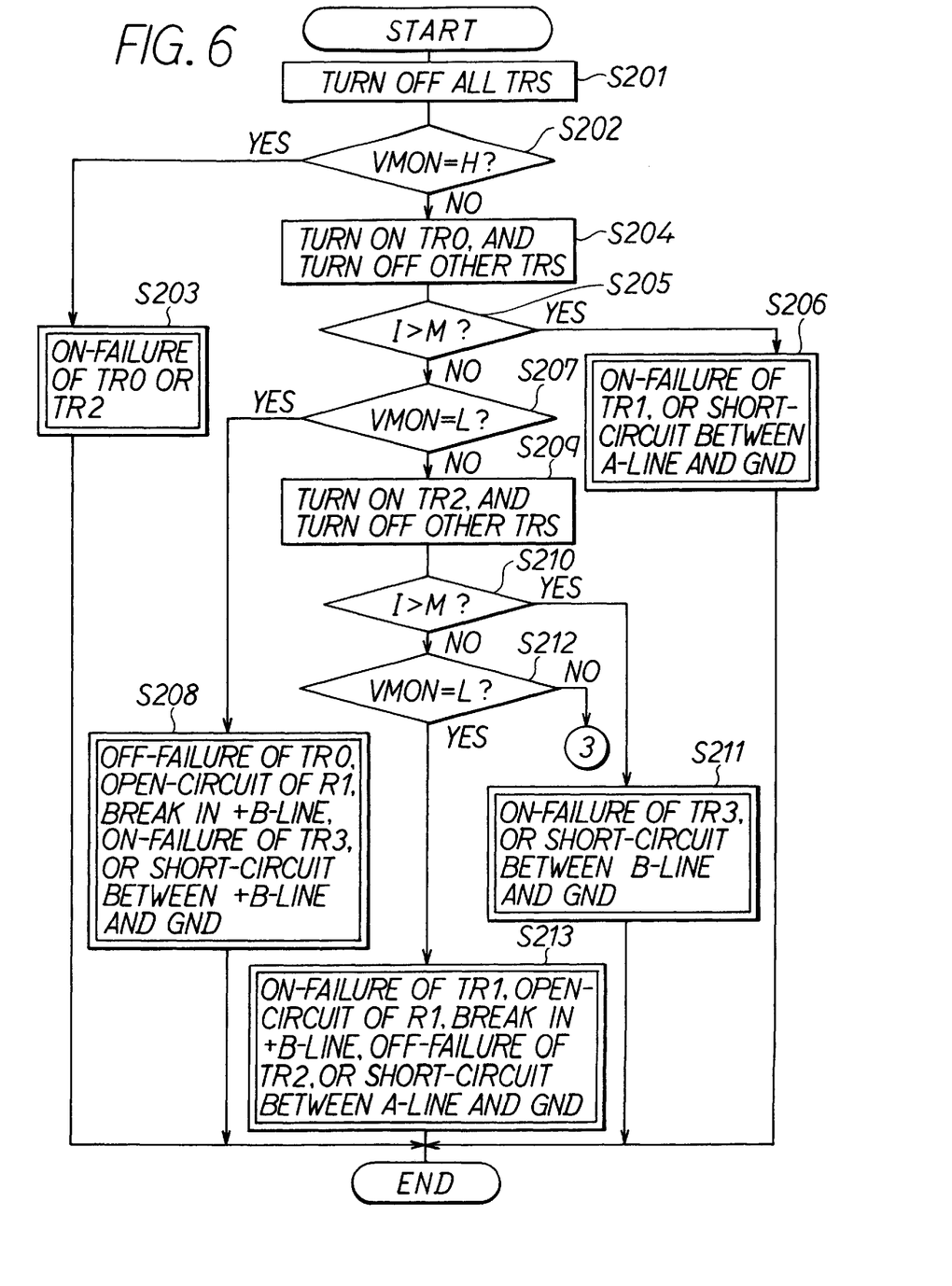
FIG. 6 is a flow diagram showing a computer processing of the embodiment when the d.c. motor is disconnected.

First in S201 shown in FIG. 6, all of the transistors TR0 to TR3 are turned off.

In S202, it is checked whether the logical level of the voltage VMON at the output terminal of each of the buffers 23 and 24 is "H" or not. In case of "H", the routine advances to S203. In case of "L", the routine moves to S204.

In S203, it is determined that at least one of the transistors TR0 and TR2 has the ON-failure.

That is, when the transistor TR0 has the ON-failure, since the voltage at the node A becomes high, the voltage at the output terminal of the buffer 23 becomes high, the voltage at the node B is also increased via the resistor R3, and the voltage at the output terminal of the buffer 24 becomes high. Consequently, the logical level of the voltage VMON becomes "H".

When the transistor TR2 has the ON-failure, the voltage at the node B becomes high, so that the voltage at the output terminal of the buffer 24 is increased, the voltage at the node A is also increased via the resistor R3, and the voltage at the output terminal of the buffer 23 becomes high. Consequently, the logical level of the voltage VMON becomes "H".

In S204, only the transistor TR0 is turned on and the other transistors TR1 to TR3 are turned off.

In S205, it is checked whether the current I is larger than the set value M or not on the basis of the logical level of the output signal of each of the comparators 21 and 22. When it is larger than the set value M, the routine advances to S206. When it is equal to or smaller than the set value M, the routine shifts to S207.

In S206, it is determined that either the ON-failure of the transistor TR1 or the short-circuit between the A-line and the ground occurs.

That is, when the transistor TR1 has the ON-failure, the current flows in the path through the resistor R1, transistor TR0, transistor TR1, and resistor R2, so that the current I flowing through the resistors R1 and R2 becomes larger than the set value M.

In case of the short-circuit between the A-line and the ground, the current flows in the path through the resistor R1, transistor TR0, and A-line to the ground, so that the current I flowing through the resistor R1 becomes larger than the set value M.

In S207, it is checked whether the logical level of the voltage VMON at the output terminal of each of the buffers 23 and 24 is "L" or not. In case of "L", the routine advances to S208. In case of "H", the routine advances to S209.

In S208, it is determined-that at least one of failures in a group occurs. The group includes the OFF-failure of the transistor TR0, open-circuit of the resistor R1, break in the +B-line, ON-failure of the transistor TR3, and short-circuit between the +B-line and the ground.

That is, in case of either the OFF-failure of the transistor TR0, open-circuit of the resistor R1, or the break in the +B-line, the voltage at each of the nodes A and B drops, so that the voltage at the output terminal of each of the buffers 23 and 24 decreases and the logical level of the voltage VMON is set to "L" by each of the buffers 23 and 24.

In case of either the ON-failure of the transistor TR3 or the short-circuit between the B-line and the ground, the voltage at the node B drops, so that the voltage at the output terminal of the buffer 24 decreases and the logical level of the voltage VMON is set to "L" by the buffer 24.

In S209, only the transistor TR2 is turned on and the other transistors TR0, TR1, and TR3 are turned off.

In S210, it is checked whether the current I is larger than the set value M or not on the basis of the logical level of the output signal of each of the comparators 21 and 22. When it is larger than the set value M, the routine advances to S211. When it is equal to or smaller than the set value M, the routine advances to S212.

In S211, it is determined that either the ON-failure of the transistor TR3 or the short-circuit between the B-line and the ground occurs.

That is, in case of the ON-failure of the transistor TR3, since the current flows in the path through the resistor R1, transistor TR2, transistor TR3, and resistor R2, the current I flowing through the resistors R1 and R2 becomes larger than the set value M.

In case of the short-circuit between the B-line and the ground, since the current flows in the path through the resistor R1, transistor TR2, and B-line to the ground, the current I flowing through the resistor R1 becomes larger than the set value M.

In S212, it is checked whether the logical level of the voltage VMON at the output terminal of each of the buffers 23 and 24 is "L" or not. If it is "L", the routine advances to S213. If it is "H", the routine shifts to S214.

In S213, it is determined that at least one of failures in a group including the OFF-failure of the transistor TR2, open-circuit of the resistor R1, break in the +B-line, ON-failure of the transistor TR1, and short-circuit between the A-line and the ground occurs.

That is, in case of either the OFF-failure of the transistor TR2, open-circuit of the resistor R1, or the break in the +B-line, the voltage at each of the nodes A and B drops, so that the voltage at the output terminal of each of the buffers 23 and 24 decreases and the logical level of the voltage VMON is set to "L" by each of the buffers 23 and 24.

In case of either the ON-failure of the transistor TR1 or the short-circuit between the A-line and the ground, the voltage at the node A decreases, so that the voltage at the output terminal of the buffer 23 decreases and the logical level of the voltage VMON is set to "L" by the buffer 23.

Figure 7:
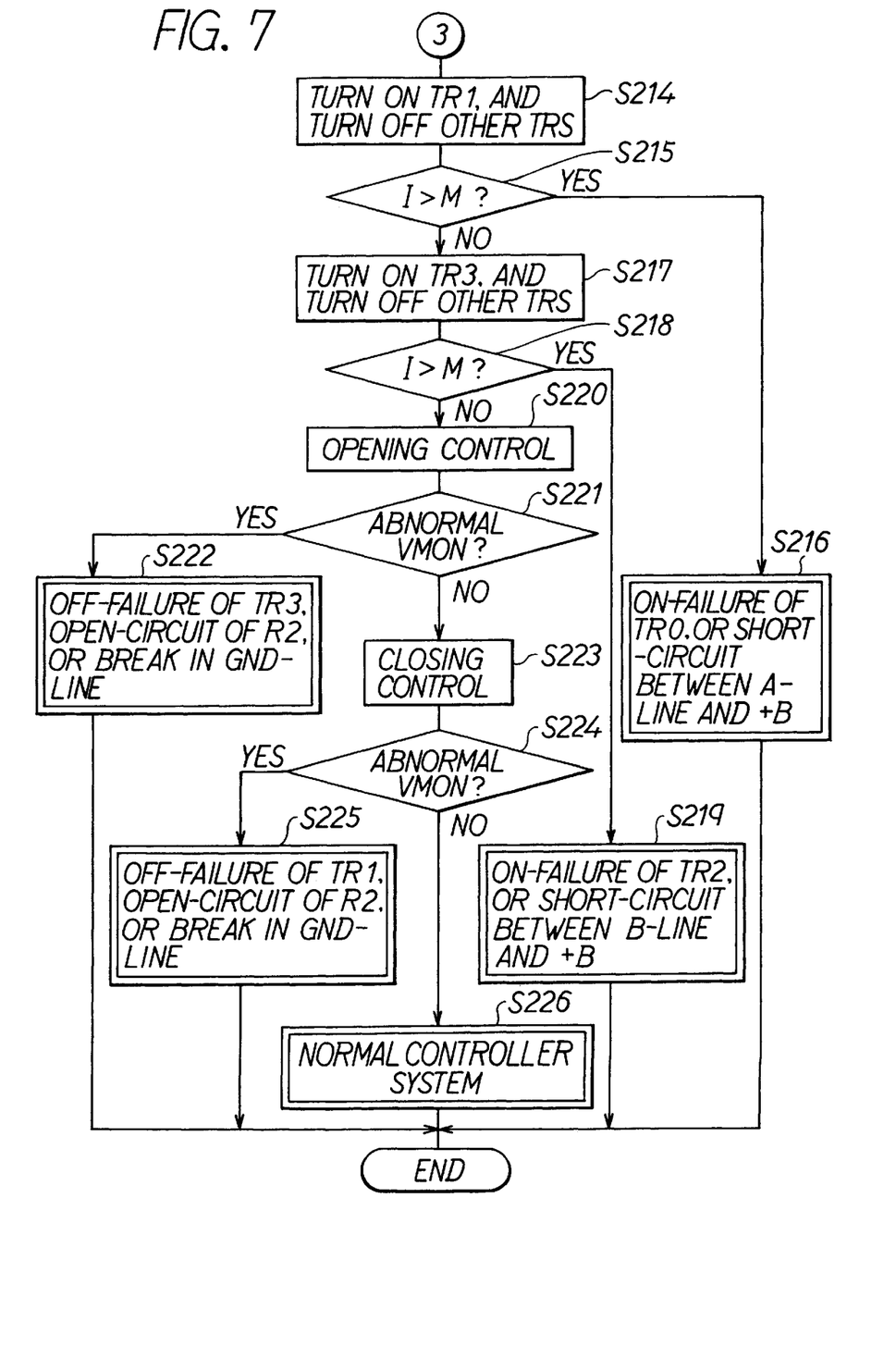
FIG. 7 is a flow diagram showing a computer processing of the embodiment when the d.c. motor is disconnected.

In S214 shown in FIG. 7, only the transistor TR1 is turned on and the other transistors TR0, TR2, and TR3 are turned off.

In S215, it is checked whether the current I is larger than the set value M or not on the basis of the logical level of the output signal of each of the comparators 21 and 22. When it is larger than the set value M, the routine advances to S216. When it is equal to or smaller than the set value M, the routine advances to S217.

In S216, it is determined that either the ON-failure of the transistor TR0 or the short-circuit between the A-line and +B occurs.

That is, in case of the ON-failure of the transistor TR0, since the current flows in the path through the resistor R1, transistor TR0, transistor TR1, and resistor R2, the current I flowing through the resistors R1 and R2 becomes larger than the set value M.

In case of the short-circuit between the A-line and +B, since the current flows in the path from the positive side (+B) of the vehicle-mounted battery through the A-line, transistor TR1, and resistor R2, the current I flowing through the resistor R2 becomes larger than the set value M.

In S217, only the transistor TR3 is turned on and the other transistors TR0 to TR2 are turned off.

In S218, it is checked whether the current I is larger than the set value M or not on the basis of the logical level of the output signal of each of the comparators 21 and 22. When it is larger than the set value M, the routine advances to S219. When it is equal to or smaller than the set value, the routine advances to S220.

In S219, it is determined that either the ON-failure of the transistor TR2 or the short-circuit between the B-line and +B occurs.

That is, in case of the ON-failure of the transistor TR2, since the current flows in the path through the resistor R1, transistor TR2, transistor TR3, and resistor R2, the current I flowing through each of the resistors R1 and R2 becomes larger than the set value M.

In case of the short-circuit between the B-line and +B, the current flows in the path from the positive side (+B) of the vehicle-mounted battery through the B-line, transistor TR3, and resistor R2, so that the current I flowing through the resistor R2 becomes larger than the set value M.

In S220, by repeatedly turning on and off the transistor TR3 at a predetermined duty ratio in a state where the transistor TR0 is kept ON, the opening control is executed.

In S221, it is checked whether or not the change in the logical level of the voltage VMON at the output terminal of each of the buffers 23 and 24 corresponds to the on/off operation of the transistor TR3 in the opening control in S220. If it does not correspond to the on/off operation and the change in the logical level of the voltage VMON is abnormal, the routine shifts to S222. If it corresponds to the on/off operation, the routine advances to S223.

In S222, it is determined that at least one of failures in a group including the OFF-failure of the transistor TR3, open-circuit of the resistor R2, and break in the GND-line occurs.

That is, at the time of any one of the failures, the voltage at each of the nodes A and B becomes high, so that the voltage at the output terminal of each of the buffers 23 and 24 becomes high and the logical level of the voltage VMON is set to normally "H", by the resistor R4.

In S223, by repeatedly turning on and off the transistor TR1 at a predetermined duty ratio in a state where the transistor TR2 remains ON, the closing control is performed.

In S224, it is checked whether the change in the logical level of the voltage VMON at the output terminal of each of the buffers 23 and 24 corresponds to the on/off operation of the transistor TR1 in the closing control in S223. If it does not correspond to the on/off operation and the change in the logical level of the voltage VMON is abnormal, the routine advances to S225. If it corresponds to the on/off operation, the routine advances to S226.

In S225, it is determined that at least one of failures in a group including the OFF-failure of the transistor TR1, open-circuit of the resistor R2, and break in the GND-line occurs.

That is, since the voltage at each of the nodes A and B increases at the time of any one of the failures, the voltage at the output terminal of each of the buffers 23 and 24 increases and the logical level of the voltage VMON is set to normally "H" by the resistor R4.

In S226, it is determined that the controller system is normal.

That is, when the result of determination in each of the processes in S202, S205, S207, S210, S212, S215, S218, S221, and S224 is NO, it can be the that the controller system is normal.

As described above in detail, according to the embodiment, by detecting the abnormality in the throttle system in accordance with the flow diagrams shown in FIGS. 6 and 7 in the state where the d.c. motor 7 is disconnected from the terminals 14 and 15, the abnormalities in the controller system (S203, S206, S208, S211, S213, S216, S219, S222, S225) can be detected. When there is any abnormality in the throttle system in the state where the controller system is normal (S226), it can be consequently determined that there is the abnormality in the throttle actuator system, and the abnormality in the controller system and that in the throttle actuator system can be detected while being distinguished from each other. By analyzing the result of determination of the microcomputer 10, the cause of the abnormality in the throttle system can be therefore easily analyzed without requiring much time.

Although it is sufficient that the set value M (hereinbelow, called "M1") in each of S205, S210, S215, and S218 is zero or larger, the set value M (hereinbelow, called "M2") in each of S104, S109, S117, and S125 is set as mentioned above. Consequently, since the same comparators 21 and 22 are used in both of the case where the d.c. motor 7 is connected to the terminals 14 and 15 (FIGS. 3 to 5) and the case where the d.c. motor 7 is disconnected from the terminals 14 and 15 (FIGS. 6 and 7), M1 and M2 are set to the same value. In S205, S210, S215, and S218, in case of either the ON-failure of each of the transistors TR0 to TR3, the short-circuit between the A or B-line and +B, or the short-circuit between the A or B-line and the ground, a considerable amount of the current I flows. Therefore, when M1 and M2 are set to the same value, no problem occurs.

The abnormality in the throttle system can be also detected in accordance with the flow diagrams shown in FIGS. 6 and 7 in a state where the ECU 11 is not mounted on a vehicle, the terminal 16 is connected to the positive terminal of the d.c. power source provided for an experimental apparatus via wire harness, the terminal 17 is connected to the negative terminal of the d.c. power source of the experimental apparatus, and the microcomputer 10 is connected to the diagnosis lamp provided for the experimental apparatus. In this manner, an abnormality in the ECU 11 alone can be detected upon shipment of the ECU 11.

The above embodiment can be modified as follows.

(1) The program to be executed by the microcomputer 10 can be also stored in not the built-in ROM but an external storage having a recording medium. That is, the program is preliminarily stored in a recording medium which can be read by a computer (semiconductor memory, hard disk, floppy disk, data card (IC card, magnetic card, or the like), optical disk (CD-ROM, DVD, or the like), magnetooptic disk (such as MD), phase change disk, magnetic tape, or the like. The program can be loaded to the microcomputer 10, activated, and used in accordance with necessity.

(2) The NMOS transistors TR0 to TR3 can be replaced with other proper switching elements (such as PMOS transistors, bipolar transistors, SITs, and thyristors).

(3) The above embodiment may be applied to not only the throttle system but also various devices driven by a d.c. motor such as a driving apparatus for a fuel injection pump. In this case, there can be provided an apparatus for detecting an abnormality in a d.c. motor driving system, which can detect an abnormality in the d.c. motor or an abnormality in a driven apparatus which is driven by the d.c. motor, and an abnormality in the switching elements for switching the d.c. motor or an abnormality in a power supply path extending from the drive power source to the d.c. motor while distinguishing the abnormalities from each other.

What is claimed is:

1. An apparatus for detecting an abnormality in a d.c. motor driving system including a d.c. motor and a driven apparatus, in which a switching element connected to the d.c. motor in series is provided in a power supply path extending from a driving power source to the d.c. motor, rotation of the d.c. motor is controlled in accordance with a switching control of the switching element, and the driven apparatus is driven by the d.c. motor, the apparatus comprising:

switching control means for switching the switching element;

drive corresponding amount detecting means for detecting a drive corresponding amount of the driven apparatus by the d.c. motor;

a resistor connected in parallel with the d.c. motor;

voltage detecting means for detecting each of voltages at both ends of the resistor; and abnormality determining means for determining an abnormality in the d.c. motor or the driven apparatus and an abnormality in the switching element or the power supply path while distinguishing the abnormalities from each other on the basis of the drive corresponding amount detected by the drive corresponding amount detecting means, and a voltage value detected by the voltage detecting means when the switching element is switching-controlled by the switching control means.

2. An apparatus of claim 1, further comprising:

current detecting means for detecting a current supplied from the driving power source to the power supply path, wherein the abnormality determining means determines the abnormalities on the further basis of a current value detected by the current detecting means.

3. An apparatus of claim 2, wherein:

the abnormality determining means determines occurrence of an abnormality in the d.c. motor or the driven apparatus, in a first case where the drive corresponding amount detected by the drive corresponding amount detecting means lies out of a normal value range, the current value detected by the current detecting means lies within a normal value range, and the voltage value detected by the voltage detecting means corresponds to the switching control of the switching element by the switching control means, or in a second case where the current value detected by the current detecting means when the d.c. motor rotates in the forward direction in accordance with the switching control of the switching element by the switching control means lies out of the normal value range, and the current value detected by the current detecting means when the d.c. motor rotates in the reverse direction lies out of the normal value range;

the abnormality determining means determines that the d.c. motor driving system is normal in a third case where the drive corresponding amount detected by the drive corresponding amount detecting means lies within the normal value range when the d.c. motor rotates in the forward direction in accordance with the switching control of the switching element by the switching control means, and the drive corresponding amount detected by the drive corresponding amount detecting means lies within the normal value range when the d.c. motor rotates in the reverse direction; and the abnormality determining means determines occurrence of an abnormality in the switching element or the power supply path in a fourth case where no abnormality in the d.c. motor or the driven apparatus is determined by the first and second cases and the d.c. motor driving system is not determined as normal by the third case.

4. An apparatus of claim 3, wherein:

the abnormality determining means determines, in the first case, occurrence of at least one of abnormalities which is selected from a group of disconnection of a coil in the d.c. motor, lock of the d.c. motor, lock of the driven apparatus, and idling of the d.c. motor due to imperfect engagement between the d.c. motor and the driven apparatus; and the abnormality determining means determines, in the second case, occurrence of short-circuit of the coil in the d.c. motor.

5. An apparatus of claim 1, wherein:

the switching element comprises first to fourth switching elements and a bridge circuit is formed by connecting the first and second switching elements which are connected in series and the third and fourth switching elements which are connected in series in parallel; and the d.c. motor is connected between a connection point of the first and second switching elements and a connection point of the third and fourth switching elements in the bridge circuit.

6. An apparatus for detecting an abnormality in a d.c. motor driving system including a d.c. motor and a driven apparatus, in which a switching element connected to the d.c. motor in series is provided in a power supply path extending from a driving power source to the d.c. motor, rotation of the d.c. motor is controlled in accordance with a switching control of the switching element, and the driven apparatus is driven by the d.c. motor, the apparatus comprising:

switching control means for switching the switching element;

current detecting means for detecting a current supplied from the driving power source to the power supply path;

a resistor connected in parallel with the d.c. motor;

voltage detecting means for detecting each of voltages at both ends of the resistor; and abnormality determining means for determining an abnormality in the switching element or the power supply path on the basis of a current value detected by the current detecting means and a voltage value detected by the voltage detecting means when the switching element is switching-controlled by the switching control means in a state where the motor is disconnected from the power supply path.

7. An apparatus of claim 6, wherein:

the abnormality determining means determines that the switching element or the power supply path is normal when the current value detected by the current detecting means lies within a normal value range and the voltage value detected by the voltage detecting means corresponds to the switching control of the switching element by the switching control means.

8. An apparatus of claim 6, wherein:

the switching element comprises first to fourth switching elements and a bridge circuit is formed by connecting the first and second switching elements which are connected in series and the third and fourth switching elements which are connected in series in parallel; and the d.c. motor is connected between a connection point of the first and second switching elements and a connection point of the third and fourth switching elements in the bridge circuit.

* * * * *